US005345045A

United States Patent [19]
Rohwedder

[11] Patent Number: 5,345,045
[45] Date of Patent: Sep. 6, 1994

[54] ACOUSTIC LENS

[75] Inventor: Arnim Rohwedder, Fuerth, Fed. Rep. of Germany

[73] Assignee: Siemens Aktiengesellschaft, Munich, Fed. Rep. of Germany

[21] Appl. No.: 125,211

[22] Filed: Sep. 23, 1993

[30] Foreign Application Priority Data

Oct. 27, 1992 [DE] Fed. Rep. of Germany ....... 4236255

[51] Int. Cl.$^5$ ............................................ G01K 11/00
[52] U.S. Cl. ..................................... 181/176; 367/150
[58] Field of Search ....................... 181/155, 175, 176; 381/155, 160; 367/150

[56] References Cited

U.S. PATENT DOCUMENTS

| | | | |
|---|---|---|---|
| 3,620,326 | 11/1971 | Hogge | 181/176 |
| 3,982,223 | 9/1976 | Green | 367/150 |
| 4,553,629 | 11/1985 | Sternberg | 181/176 |
| 4,629,030 | 12/1986 | Ferralli | 181/155 |
| 4,844,198 | 7/1989 | Feralli | 181/155 |
| 5,269,292 | 12/1993 | Granz et al. | 367/150 X |

FOREIGN PATENT DOCUMENTS 3924919 2/1990 Fed. Rep. of Germany .

OTHER PUBLICATIONS

"Das Elektromagnetische Stosswellensystem von Siemens," buchholtz et al., Siemens AG, Bereich Medizinische Technik, Nov., 1991, pp. 29–33.

*Primary Examiner*—Michael L. Gellner
*Assistant Examiner*—Khanh Dang
*Attorney, Agent, or Firm*—Hill, Steadman & Simpson

[57] ABSTRACT

An acoustic lens for the transformation of a planar wave into a spherical segment-shaped wave, and vice versa, is disclosed. In order to avoid aberrations, the lens is fashioned rotationally symmetrical relative to its center axis and biconcavely, the lens surface adjoining the medium in which the planar wave propagates is produced by the rotation of a section of a straight line, the lens surface adjoining the medium in which the spherical segment-shaped wave propagates is produced by the rotation of a section of an ellipse, and the angle between the straight line and the center axis as well as the angle between the major half-axis of the ellipse and the center axis are selected such that a planar or spherical segment-shaped wave entering into the lens propagates in the lens as a conical wave whose aperture angle is equal to double the angle at which the minor half-axis of the ellipse intersects the center axis.

14 Claims, 5 Drawing Sheets

ACOUSTIC LENS

BACKGROUND OF THE INVENTION

1. Field of the Invention

The invention is directed to an acoustic lens of the type for the transformation of a planar acoustic wave into a spherical segment-shaped acoustic wave and vice versa, for use with media in which the planar or spherical segment-shaped waves propagate having a sound propagation speed therein which is lower than the sound propagation speed in the lens material.

2. Description of the Prior Art

A number of proposals for realizing a lens of the type generally described above are known from the publication "Das elktromagnetische Stosswellensystem von Siemens", by G. Buchholtz et al., Siemens AG, Bereich Medizinische Technik, November 1991, pages 29–33. For example, lenses are known wherein the lens surface adjoining the medium wherein the planar wave propagates is spherically fashioned. In this case, the lens surface that adjoins the medium wherein the spherical segment-shaped wave propagates can be spherically or elliptically fashioned. An elliptical fashioning of both lens surfaces is also known. Further, it is known to fashion the lens surface adjoining the medium wherein the planar wave propagates hyperbolically and to fashion the other lens surface spherically. More or less pronounced aberrations occur in the case of all these lens geometries.

German OS DE 39 24 919 also discloses an acoustic lens having one lens surface formed by two different aspherical surfaces.

Further, U.S. Pat. No. 4,844,198 discloses a focusing arrangement for planar acoustic waves which has two reflector surfaces, one having a parabolic shape and the other having an elliptical shape.

Further, U.S. Pat. No. 4,553,629 discloses an acoustic lens having an elliptical contour with lens surfaces defined by a system of non-linear, partial differential equations.

SUMMARY OF THE INVENTION

An object of the present invention is to fashion an acoustic lens of the type initially cited such that aberrations are avoided to the greatest possible extent.

This object is inventively achieved in a lens having a lens body which is biconcavely fashioned and is fashioned rotationally symmetrical relative to its center axis. The lens body has a surface adjoining the medium wherein the planar wave propagates produced by the rotation of a section of a straight line intersecting the center axis of the lens. The lens body surface adjoining the medium wherein the spherical segment-shaped wave propagates is produced by the rotation of a section of an ellipse whose major and minor half-axes intersect the center axis of the lens. The angle between the straight line and the center axis of the lens body as well as the angle between the major half-axis of the ellipse and the center axis of the lens body are selected such that a planar or spherical segment-shaped wave entering into the lens propagates in the lens body as a conical wave whose aperture angle is equal to twice the angle at which the minor half-axis of the ellipse intersects the center axis of the lens. This is the case when $$\frac{c_2}{c_1} = \frac{\sin(\alpha + \beta)}{\sin \alpha}$$

and $$\frac{c_3}{c_2} = \frac{e}{a} = \sqrt{1 - \frac{b^2}{a^2}}$$

are valid, wherein a is the major and b is the minor half-axis of the ellipse, $c_1$, $c_2$ and $c_3$ are the respective sound propagation speeds in the medium of the planar wave, the lens body material and the medium of the spherical segment-shaped wave, e is the linear eccentricity of the ellipse, $\alpha$ is the angle between the straight line and center axis of the lens, and $\beta$ is the angle between the major half-axis of the ellipse and the center axis of the lens.

A lens fashioned in this way represents the exact acousto-optical solution for the transformation of a planar acoustic wave into a spherical segment-shaped acoustic wave and vice versa, so that no aberrations occur, at least theoretically. It is preferable that the lens surfaces are surfaces of revolution of simple cone sections, so that the fabrication of the lens of the invention is as simple and cost-beneficial as possible, for example, using CNC lathes and the standard functions available on such lathes. As a consequence of the fact that the lens of the invention is a biconcave lens, the advantage of low reflection losses is also achieved.

Improved possibilities of being able to match the lens to individual requirements are established when the lens is composed of two lens parts of different lens materials. In this context, in a version of the invention the lens body is subdivided into two lens parts, the seam between the two lens parts is produced by the rotation of a section of a straight line proceeding parallel to the smaller half-axis of the ellipse, and the lens parts are formed of different lens materials wherein the sound propagation speed differs. The conditions $$\frac{c_2}{c_1} = \frac{\sin(\alpha + \beta)}{\sin \alpha}$$

and $$\frac{c_3}{c_4} = \frac{e}{a} = \sqrt{1 - \frac{b^2}{a^2}}$$

are valid, whereby a is the larger and the b is the smaller half-axis of the ellipse, $c_1$, $c_2$, $c_3$ and $c_4$ are the respective sound propagation speeds in the medium of the planar wave, in the lens material of the lens part adjoining the medium of the planar wave, in the medium of the spherical segment-shaped wave and in the lens material of the lens part adjoining the medium of the spherical segment-shaped wave, e is the linear eccentricity of the ellipse, $\alpha$ is the angle between the straight line and the center axis of the lens, and $\beta$ is the angle between the major half-axis of the ellipse and the center axis of the lens. As a consequence of this fashioning and despite the different sound propagation speeds in the lens materials of the two lens products, no refraction occurs upon transmission of the acoustic wave traversing the lens from the one into the other lens part since the wave front is incident on the seam perpendicularly.

In a further version of the invention, the lens body has the thickness zero measured on the middle axis of the lens. In this case, minimum attenuation (damping) losses arise for waves having a full-surface, for example circular-disc-shaped, cross section. For waves having a cross section such that they exhibit a central, wave-free region through whose center the center axis of the lens proceeds, for example waves that have an annular cross section, the lens in a version of the invention is provided with a central opening and is fashioned such that the straight line and the ellipse intersect in a point whose distance from the center axis of the lens corresponds to the radius of the opening, or of the wave-free space of the planar waves. The attenuation losses are also minimum in this case.

A further object of the invention is to specify an acoustic lens into which at least one planar pressure sensor can be integrated in a simple way, thereby enabling the in-phase reception of a wave front traversing the lens.

This object is achieved in a preferred version of the invention wherein the lens is subdivided into two lens parts, and the seam between the two lens parts is produced by the rotation of a section of a straight line that proceeds parallel to the smaller half-axis of the ellipse. Due to the fact that a planar wave entering into the lens through the conical lens surface as well as a spherical segment-shaped wave entering into the lens through the elliptical lens surface, both propagate in the lens as a conical wave whose wave front proceeds parallel to the minor ellipse half-axis when viewed in longitudinal section, this fashioning offers the possibility of the wave propagated in the lens being received in-phase. Moreover, the further advantage is achieved that the seam can be developed into the plane and a pressure sensor that is planar in its initial condition, for example a piezoelectrically activated PVDF foil, can be unproblematically applied insofar as it is adequately flexible. An additional advantage is that, given employment of a piezoelectric element as the pressure sensor, this itself can be excited to transmit sound waves. These first propagate in the lens as conical waves and emerge through the conical lens surface as planar waves and emerge through the elliptical lens surface as spherical waves. The lens parts can be formed of different lens materials.

As used herein, "lens body" means the total lens volume which consists of lens (focusing) material. In some embodiments the lens body is a unitary, continuous element, whereas in other embodiments the lens body is formed by elements joined at a seam.

DESCRIPTION OF THE PREFERRED EMBODIMENTS

Figure 1:
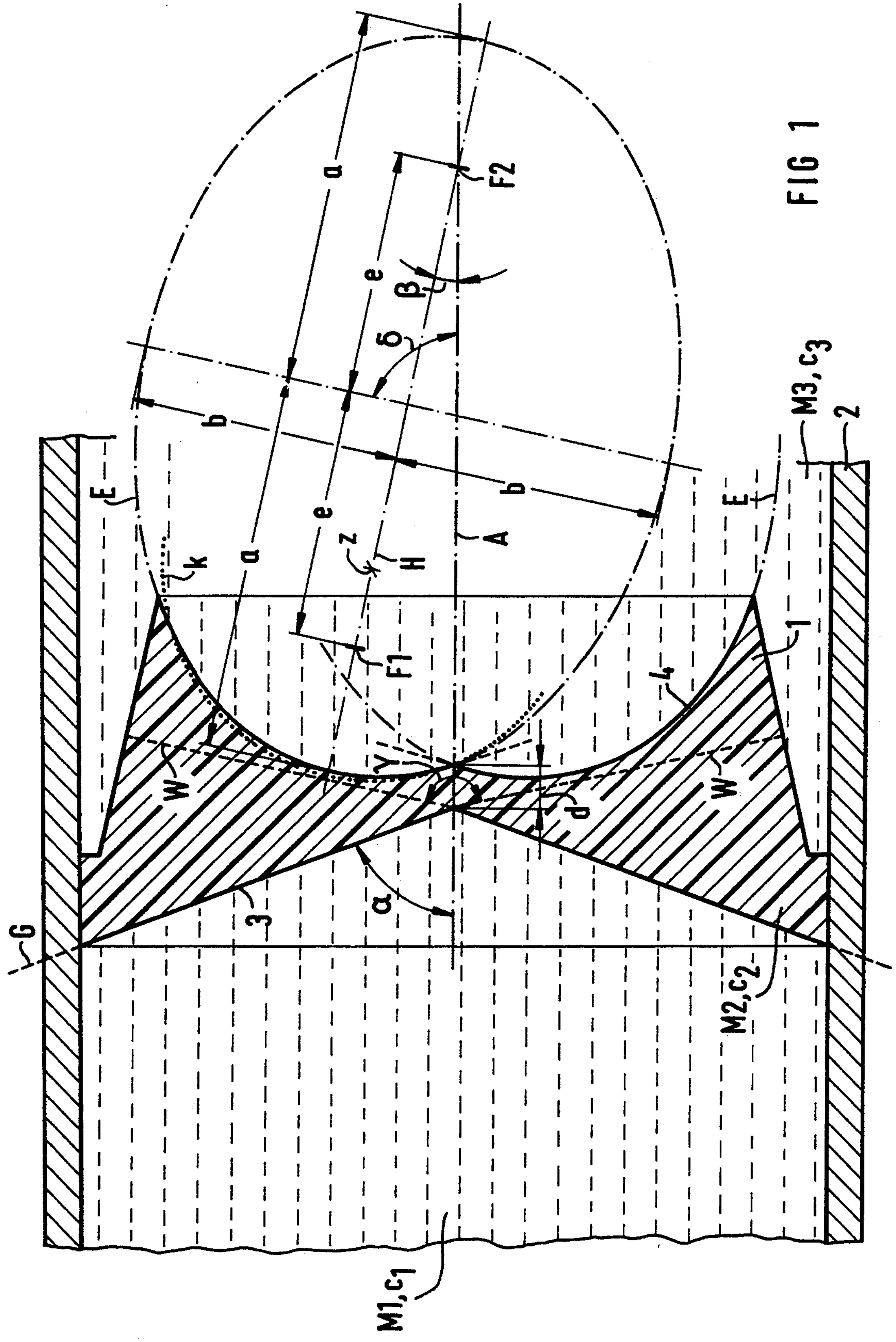
FIGS. 1 and 2 show respective longitudinal sections through a lens of the invention.

FIG. 1 shows a lens 1 of the invention that is accepted in a tubular component 2 such that it separates a medium M1 having a sound propagation speed $c_1$ therein from a medium M3 having a sound propagation speed $c_3$ therein. The lens 1 is composed of a medium M2 having a sound propagation speed $c_2$ therein.

The lens is rotationally symmetrically fashioned with reference to an axis A lying in the plane of the drawing. The axis A is thus the center axis of the lens 1.

The lens surface 3 adjoining the medium M1 is produced by the rotation of the section of a straight line G entered in broken lines in FIG. 1 that intersects the axis A at an angle which is selected such that the lens surface 3 represents a concave, conical depression.

The lens surface 4 adjoining the medium M3 is produced by the rotation of the section of an ellipse E entered in dot-dash lines in FIG. 1 around the axis A, whereby the major axis of the ellipse E intersects the axis A at the angle $\beta$, namely around that focal point F2 of the two focal points F1 and F2 of the ellipse E that has a distance from the lens surface 4 measured along the major axis H which is equal to the sum of the larger half-axis a and the linear eccentricity e.

When the angles $\alpha$ and $\beta$ are selected such that $$\frac{c_2}{c_1} = \frac{\sin(\alpha + \beta)}{\sin \alpha}$$

is valid for the ration of the sound velocities $c_2$ and $c_1$, and $$\frac{c_3}{c_2} = \frac{e}{a} = \sqrt{1 - \frac{b^2}{a^2}}$$

is valid for the ratio of the sound velocities $c_3$ and $c_2$, then the lens 1 transforms a planar wave entering into the lens 1 from the planar medium M1 and having a wave front proceeding at a right angle relative to the axis A into a spherical wave propagating in the medium M3, that is focused onto the focal point F2 of the ellipse E. Conversely, the lens 1 transforms a spherical wave or a spherical segment-shaped wave emanating from the focal point F2 of the ellipse E into a planar wave propagating in the medium M1. In both instances, aberrations are entirely avoided under ideal conditions. In both instances, moreover, the wave that enters into the lens 1 propagates within the lens 1 as a conical wave whose aperture angle $\gamma$—as can been seen with reference to the example of wave front W entered with broken lines in FIG. 1—is equal to twice the angle $\delta$ at which the minor half-axis b of the ellipse E intersects the axis A, i.e. the wave front W proceeds parallel to the minor half-axis b of the ellipse E as seen in a longitudinal section.

Figure 2:
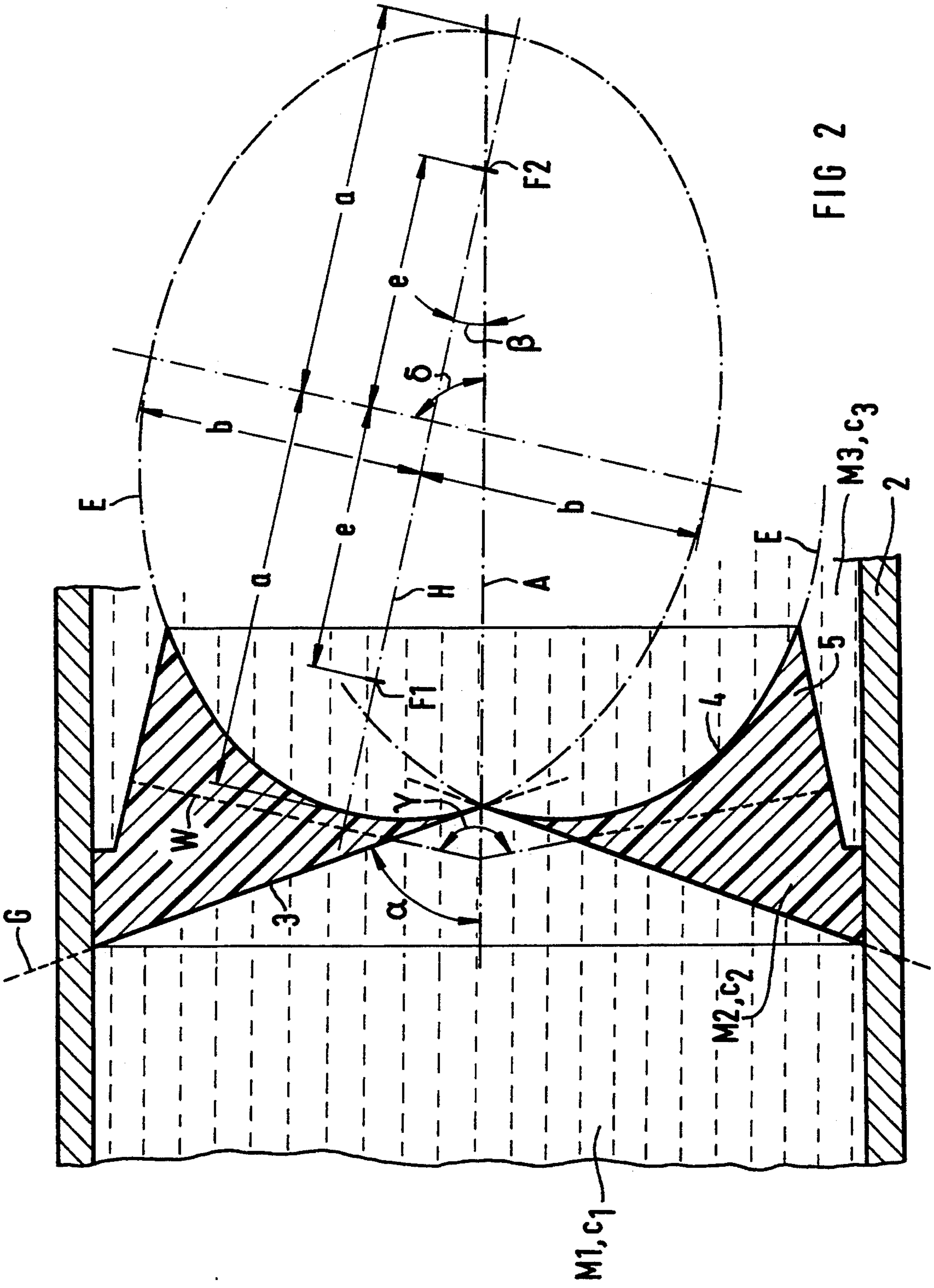

The lens 5 according to FIG. 2 differs from that set forth above, which has a thickness d measured on the axis A, only in that it has a thickness zero measured on the axis A. In this case, the attenuation losses in the lens 5 are minimum since it has the lowest possible thickness measured at arbitrary locations in the sound propagation direction. As used herein, a thickness d equal to zero means that an acoustically negligible, minimum thickness d is present which still assures the separation of the media M1 and M3. When, differing from that shown in FIG. 2, the same medium is present at both sides of the lens 5, the thickness d measured on the axis A can in tact have the value zero.

Figure 3:
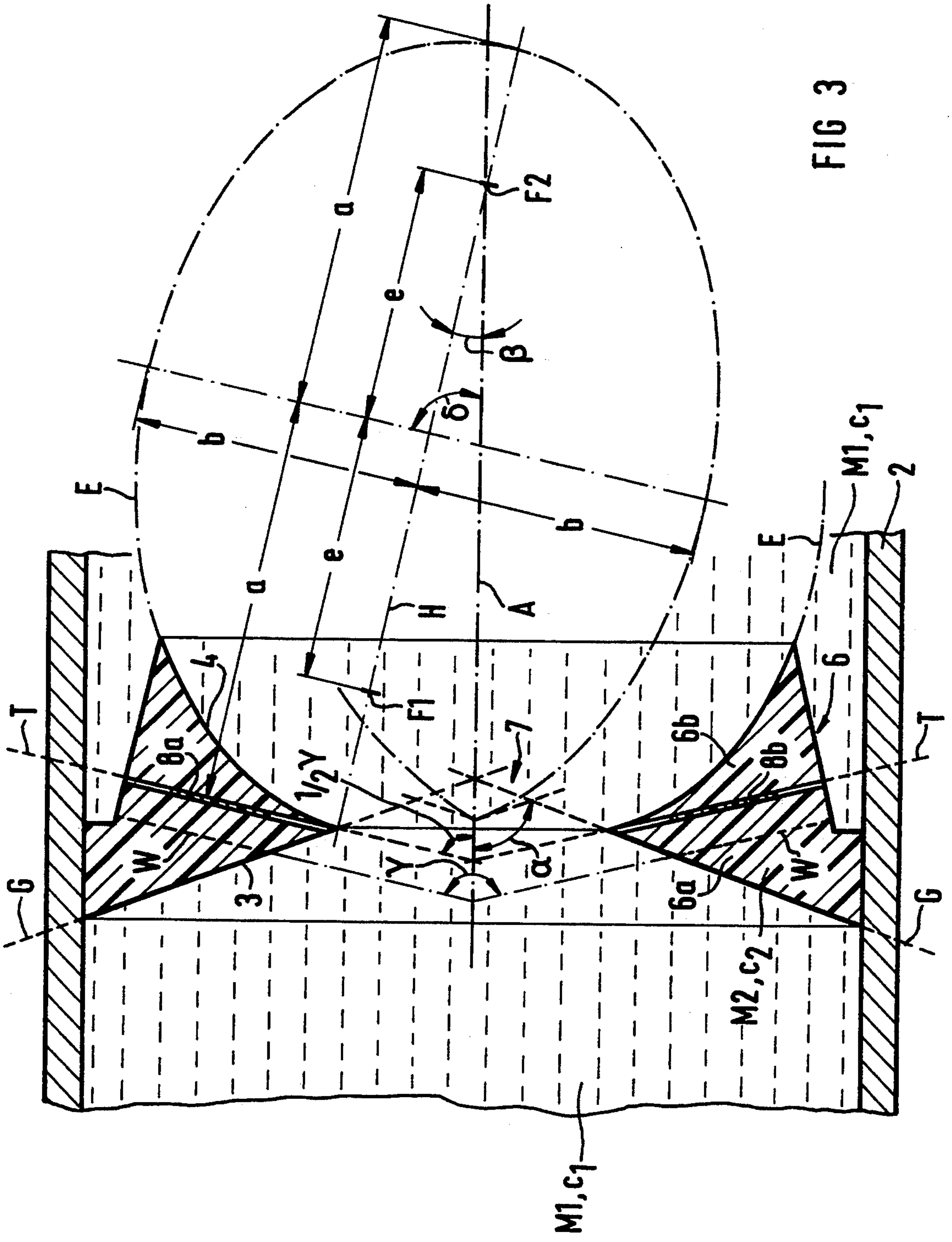
FIG. 3 shows another longitudinal section through a lens of the invention which contains piezoelectric elements and has a central bore.
Figure 4:
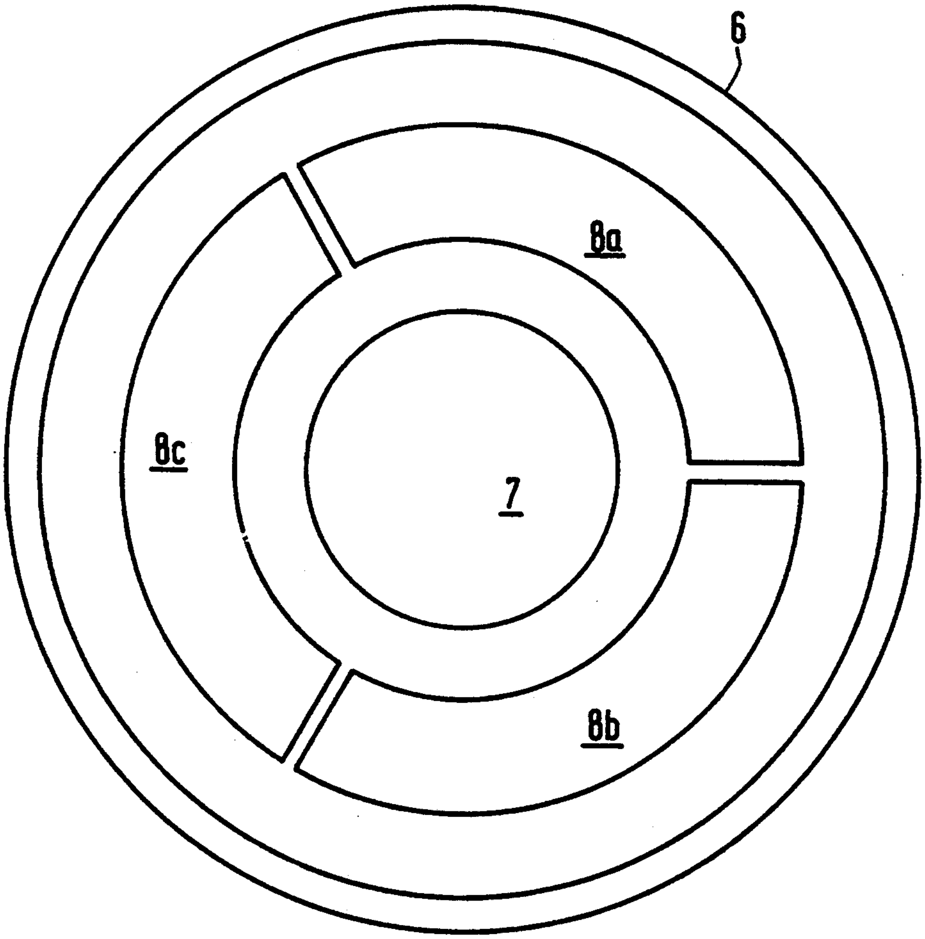
FIG. 4 is an end elevational view of the lens according to FIG. 3.

The lens 6 according to FIGS. 3 and 4 differs from the two lenses set forth above in that it has a central opening 7. For example, this is desirable given employment of the lens 6 in a therapy unit for treatment of a subject with focused acoustic waves since the ultrasound head of an ultrasound locating means can then extend through the opening 7. This means in practice that the same medium M1 is present at both sides of the lens, as shown in FIG. 3, insofar as a partition is not formed by a tube or the like (not shown) extending through the opening 7 in order to enable the employment of different media. When, as shown in FIG. 3, the same medium, namely the medium M1 having the sound propagation speed $c_1$, is provided for the planar as well as for the spherical segment-shaped wave (i.e., the same medium is located at both sides of the lens 6), the sound propagation speed $c_1$ is introduced into the second formula recited in conjunction with the lens of FIG. 1 instead of the sound propagation speed $c_3$. In order to keep the attenuation losses of the lens 6 at a minimum, the lens 6 is fashioned such that the straight line G and the ellipse E intersect in a point whose distance from the axis A corresponds to the radius of the opening 7. A further difference compared to the embodiments set forth above is that the lens 6 is divided into two lens parts 6*a* and 6*b*, whereby the seam is produced by the rotation of the section of a straight line T proceeding parallel to the minor half-axis b of the ellipse E. As can been seen in conjunction with FIG. 4, planar, piezoelectric elements, namely three piezoelectrically activated polyvinylidene fluoride (PVDF) foil sections 8*a*, 8*b* and 8*c* are employed a pressure sensors. These each have an annular shape as viewed in the direction of the axis A extending over approximately 120°, and are applied to the respective seam surfaces of the two lens parts 6*a* and 6*b* connected to one another by a thin adhesive layer. The pressure curve of an acoustic field passing through the lens 6 can be measured with these pressure sensors. In the case of therapy units for treatment with focused acoustic waves, for example, the use of such piezoelectric foils makes it possible to monitor the acoustic waves output by the unit, and the foils also form means to receive echoes of these acoustic waves for locating purposes. German PS 40 34 533 discloses a therapy unit which employs piezoelectric foils in this manner, but which has an acoustic lens that is fashioned differently from the present invention. As already explained in the discussion of the embodiment of FIG. 1, the lens of the invention offers the advantage that the location of all points in the lens 6 having the same phase relation is a conical surface whose generated line proceeds parallel to the minor half-axis b of the ellipse E, both for the case of a planar wave entering into the lens 6 from the left and the case of a spherical wave entering into the lens 6 from the right. This means that an in-phase reception of an acoustic field passing through the lens 6 is fundamentally possible with the PVDF foil sections 8*a* through 8*c*, regardless of whether this enters into the lens 6 as a planar wave coming from the left or as a spherical wave coming from the right emanating from the focal point F2.

A further advantage of the embodiment of FIGS. 3 and 4 is that conical waves that emerge from the lens 6 toward the left as planar waves and emerge from the lens 6 toward the right as spherical waves focused onto the local point F2 emanate from the driven PDVF foil sections when a plurality of PVDF foil sections 8*a* through 8*c*, or individual PVDF foil sections 8*a* through 8*c*, are driven by suitable electrical signals. The spherical waves generated in this way can, in particular, be transmitted in therapy units for treatment with focused ultrasound for the purpose of pulse-echo locating of a region to be treated, and can be both transmitted and received with the PVDF foil sections 8*a* through 8*c*.

Figure 5:
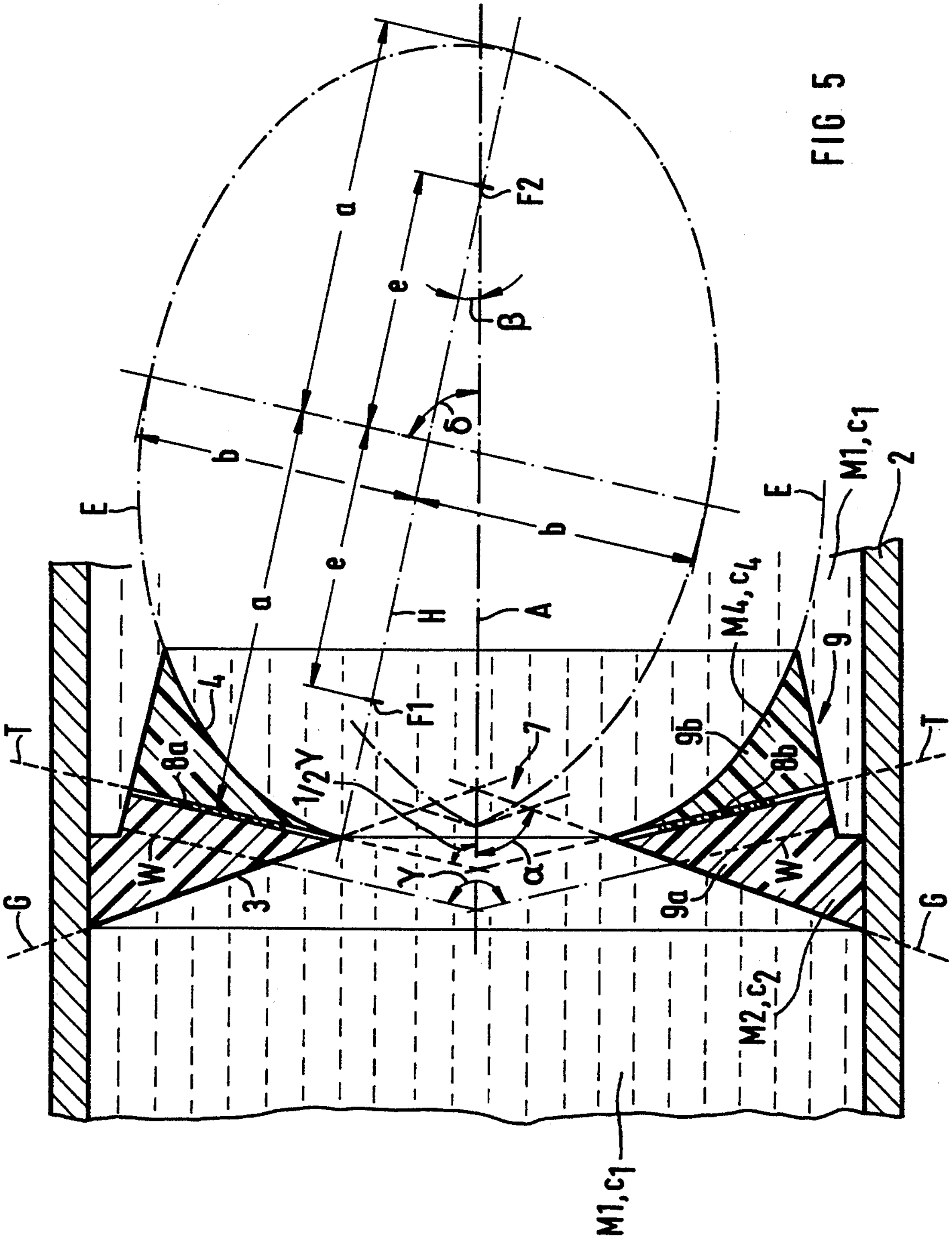
FIG. 5 is a version of the lens according to FIGS. 3 and 4 shown in longitudinal section.

The embodiment of FIG. 5 differs from that according to FIGS. 3 and 4 in that the two lens parts 9*a* and 9*b* of the lens are formed of different lens materials (M2 and M4) wherein different sound propagation speeds $c_2$ and $c_4$ are present. The lens part 9*a* forming the conical lens surface 3 is composed of the lens material M2 and the lens part 9 forming the ellipsoid-shaped lens surface 4 is composed of the lens material M4. In order, despite the employment of two different lens materials M2 and M4, to guarantee the above-described functioning of the lens, $$\frac{c_2}{c_1} = \frac{\sin(\alpha + \beta)}{\sin \alpha}$$

and $$\frac{c_3}{c_4} = \frac{e}{a} = \sqrt{1 - \frac{b^2}{a^2}}$$

must be valid. When, as shown in FIG. 5, the same medium M1 having the sound propagation speed $c_1$ is provided for the planar wave and for the spherical segment-shaped wave, and thus the same medium is located at both sides of the lens 9, the sound propagation speed $c_1$ is introduced into the latter equation instead of the sound propagation speed $c_3$.

Improved possibilities of matching the lens 9 to the respective requirements arise as a consequence of employing two different lens materials M2 and M4. Since the cone conical wave propagating in the lens 9 is incident on the seam between the lens parts 9*a* and 9*b* at a right angle, no refraction occurs. Just like the lens according to FIGS. 3 and 4, the lens 9 can be provided with piezoelectrically activated PVDF foil sections 8*a* through 8*c* in the region of the seam between the lens parts 9*a* and 9*b*, as shown in FIG. 5. The statements made in this context with respect to the embodiment of FIGS. 3 and 4 analogously apply to the embodiment of FIG. 5.

It is clear that the lenses according to FIGS. 1 and 2 can be subdivided into lens parts of different lens materials in a way analogous to FIGS. 3 and 4, but PVDF foil sections need not necessarily be arranged in the seam.

In addition to the theoretically complete avoidance of aberrations, the described exemplary embodiments share the advantage that the corresponding lenses, or forms for their manufacture, can be easily made with standard CNC machine tools. Other pressure sensors that need not necessarily be constructed according to the piezoelectric principle can also be employed instead of PVDF foil sections.

It is also possible, if the lenses according to FIGS. 1 and 2 are divided in the way set forth in conjunction with FIGS. 3 and 4, to provide them with PVDF foil segments. The number of PVDF foil segments need not necessarily be equal to three; higher or lower numbers of foils are also possible. A single PVDF foil section can suffice.

Even though different media M1 and M3 can be adjacent at the two lens surfaces 3 and 4, as set forth above, it will frequently be the case in practice that the same medium is present at both sides of the lens. In the case of medical applications, this will usually be water, whose acoustic impedance approximately coincides with that of body tissue. In this case, polystyrol, for example, is suitable as the lens material M2 in the case of the embodiments according to FIGS. 1 through 4. Polystyrol and polymethylpentene (TPX), for example, are suitable as the lens materials M2 and M4 in the case of the embodiment according to FIG. 5.

The section of the ellipse E, moreover, can be approximated by the section of a circle K indicated with dots in FIG. 1 by way of example. The center of the circle A is referenced Z in FIG. 1.

Although modifications and changes may be suggested by those skilled in the art, it is the intention of the inventor to embody within the patent warranted hereon all variations as reasonably and properly come within the scope of his contribution to the art.

I claim as my invention:

1. An acoustic lens for transforming a planar acoustic wave traveling in an acoustic propagation medium into a spherical segment-shaped acoustic wave traveling in an acoustic propagation medium, and vice versa, said acoustic lens comprising:

a biconcave lens body having a center axis and being rotationally symmetric relative to said center axis, said lens body consisting of lens material having a sound propagation speed therein which is greater than the sound propagation speed of the medium in which said planar acoustic wave travels and which is greater than the sound propagation speed of the medium in which said spherical segment-shaped acoustic wave travels;

said lens body having a lens surface adjacent said medium in which said planar acoustic wave travels produced by rotation of a section of a straight line intersecting said center axis of said lens body at an angle;

said lens body having a lens surface adjacent said medium in which said spherical segment-shaped wave travels produced by rotation of a section of an ellipse, said ellipse having major and minor half-axes intersecting said center axis of said lens body at respective angles; and said angle between said straight line and said center axis of said lens body, and said angle between said major half-axis of said ellipse and said center axis of said lens body, being selected for causing a planar or spherical segment-shaped wave entering into said lens body to propagate in said lens body as a conical wave having an aperture angle equal to twice said angle at which said minor half-axis of said ellipse intersects said center axis of said lens body.

2. A lens as claimed in claim 1, wherein $$\frac{c_2}{c_1} = \frac{\sin(\alpha + \beta)}{\sin \alpha}$$

and $$\frac{c_3}{c_2} = \frac{e}{a} = \sqrt{1 - \frac{b^2}{a^2}}$$

wherein a is the major and b is the minor half-axis of the ellipse, $c_1$, $c_2$ and $c_3$ are the respective sound propagation speeds in the medium in which the planar acoustic wave travels, in the lens material and in the medium in which the spherical segment-shaped acoustic wave travels, e is the linear eccentricity of the ellipse, $\alpha$ is the angle between the straight line and the center axis of the lens body, and $\beta$ is the angle between the major half-axis of the ellipse and the center axis of the lens body.

3. A lens as claimed in claim 1, for use wherein the medium in which the planar acoustic wave travels is the same as the medium in which said spherical segment-shaped acoustic wave travels, and wherein $$\frac{c_2}{c_1} = \frac{\sin(\alpha + \beta)}{\sin \alpha}$$

and $$\frac{c_1}{c_2} = \frac{e}{a} = \sqrt{1 - \frac{b^2}{a^2}}$$

wherein a is the major and b is the minor half-axis of the ellipse, $c_1$ and $c_2$ are the respective sound propagation speeds in the medium in which the planar acoustic wave and the spherical segment-shaped acoustic wave travel and in the lens material, e is the linear eccentricity of the ellipse, $\alpha$ is the angle between the straight line and the center axis of the lens body, and $\beta$ is the angle between the major half-axis of the ellipse and the center axis of the lens body.

4. A lens as claimed in claim 1, wherein the lens comprises two lens parts joined at a seam, said lens parts consisting of different lens materials in which the sound propagation speed respectively differs.

5. A lens as claimed in claim 4, further comprising a pressure sensor disposed in said seam.

6. A lens as claimed in claim 5, wherein said pressure sensor comprises a piezoelectric element.

7. A lens as claimed in claim 4, wherein the seam between the two lens parts is produced by the rotation of a section of a further straight line proceeding parallel to the minor half-axis of the ellipse, wherein $$\frac{c_2}{c_1} = \frac{\sin(\alpha + \beta)}{\sin \alpha}$$

and $$\frac{c_3}{c_4} = \frac{e}{a} = \sqrt{1 - \frac{b^2}{a^2}}$$

wherein a is the major and b is the minor half-axis of the ellipse, $c_1$, $c_2$, $c_3$ and $c_4$ are the respective sound propagation speeds in the medium in which the planar acoustic wave travels, in the lens material of the lens part adjacent the medium in which the planar acoustic wave travels, in the medium in which the spherical segment-shaped acoustic wave travels, and in the lens material of the lens part adjacent the medium in which the spherical segment-shaped acoustic wave travels, e is the linear eccentricity of the ellipse, $\alpha$ is the angle between the straight line and the center axis of the lens, and $\beta$ is the angle between the major half-axis of the ellipse and the center axis of the lens body.

8. A lens as claimed in claim 4, for use wherein the medium in which the planar acoustic wave travels is the same as the medium in which the spherical segment-shaped acoustic wave travels, wherein the seam between the two lens parts is produced by the rotation of a further section of a straight line proceeding parallel to the minor half-axis of the ellipse, and wherein $$\frac{c_2}{c_1} = \frac{\sin(\alpha + \beta)}{\sin \alpha}$$

and $$\frac{c_1}{c_4} = \frac{e}{a} = \sqrt{1 - \frac{b^2}{a^2}}$$

wherein a is the major and b is the minor half-axis of the ellipse, $c_1$, $c_2$ and $c_4$ are the respective sound propagation speeds in the medium in which the planar acoustic wave and the spherical segment-shaped acoustic wave travel, in the lens material of the lens part adjoining the planar acoustic wave, and in the lens material of the lens part adjoining the spherical segment-shaped acoustic wave, e is the linear eccentricity of the ellipse, $\alpha$ is the angle between the straight line and the center axis of the lens body and $\beta$ is the angle between the major half-axis of the ellipse and the center axis of the lens body.

9. A lens as claimed in claim 1, wherein said lens body has a thickness of zero measured on said center axis of said lens body.

10. A lens as claimed in claim 1, wherein said lens body has an opening with a radius centered around said center axis, and wherein said straight line and said ellipse intersect at a point having a distance from said center axis equal to said radius of said opening.

11. A lens as claimed in claim 1, wherein said lens body comprises two lens parts joined at a seam, and wherein said seam between said two lens parts is produced by the rotation of a section of a further straight line proceeding parallel to the minor half-axis of the ellipse, and further comprising at least one planar pressure sensor disposed in said seam.

12. A lens as claimed in claim 11, further comprising a planar pressure sensor disposed in said seam.

13. A lens as claimed in claim 12, wherein said pressure sensor comprises a piezoelectric element.

14. A lens as claimed in claim 1, wherein said section of said ellipse is approximated by the section of a circle.

* * * * *